(12) United States Patent
Walter

(10) Patent No.: US 11,169,501 B2
(45) Date of Patent: Nov. 9, 2021

(54) METHOD AND DEVICE FOR PROCESSING DATA VIA CODED OPERATIONS

(71) Applicant: Siemens Aktiengesellschaft, Munich (DE)

(72) Inventor: Maximilian Walter, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/545,775

(22) Filed: Aug. 20, 2019

(65) Prior Publication Data

US 2020/0064805 A1    Feb. 27, 2020

(30) Foreign Application Priority Data

Aug. 21, 2018 (EP) ..................... 18189988

(51) Int. Cl.
*G06F 11/00* (2006.01)
*G05B 19/05* (2006.01)
*G06F 7/50* (2006.01)

(52) U.S. Cl.
CPC .............. *G05B 19/05* (2013.01); *G06F 7/50* (2013.01); *G05B 2219/1208* (2013.01)

(58) Field of Classification Search
None
See application file for complete search history.

(56) References Cited

U.S. PATENT DOCUMENTS

| | | | | |
|---|---|---|---|---|
| 6,724,813 B1* | 4/2004 | Jamal | .................... | H04W 72/02 375/219 |
| 6,940,827 B2* | 9/2005 | Li | .......................... | H04B 1/707 370/278 |
| 2003/0039301 A1* | 2/2003 | Bradley | ................. | H04B 1/707 375/147 |
| 2007/0223367 A1* | 9/2007 | Wu | ....................... | H04L 1/0625 370/216 |
| 2010/0091902 A1* | 4/2010 | Park | ...................... | H04L 1/1893 375/295 |
| 2013/0219231 A1 | 8/2013 | Richter et al. | | |

(Continued)

FOREIGN PATENT DOCUMENTS

| | | |
|---|---|---|
| EP | 2631802 | 8/2013 |
| EP | 3104276 | 12/2016 |

OTHER PUBLICATIONS

Forin P: "Vital coded microprocessor principles and application for various transit systems", Control, Computers, Communications in Transportation : Selected Papers From the IFAC/IFIP/IFORS Symposium, Paris, France, Sep. 19-21, Pergamon, Oxford, GB, pp. 79-84, XP008145769, ISBN: 978-0-08-037025-5, the whole document; 1989.

(Continued)

*Primary Examiner* — Mujtaba M Chaudry
(74) *Attorney, Agent, or Firm* — Cozen O'Connor

(57) ABSTRACT

A computer program product, a device, a functionally secure programmable controller and a method for processing data via coded operations in a number of cycles, wherein an uncoded variable x is coded with a cycle-specific signature D and a variable-specific signature $B_x$ to form a coded variable $x_c$ in accordance with the relationship: $x_c = D \cdot x + B_x$.

14 Claims, 2 Drawing Sheets

(56) References Cited

U.S. PATENT DOCUMENTS

| | | | |
|---|---|---|---|
| 2015/0236884 A1* | 8/2015 | Suh | H04H 20/33 |
| | | | 375/295 |
| 2016/0365871 A1* | 12/2016 | Richter | H04M 13/00 |
| 2018/0165393 A1* | 6/2018 | Mitra | G11C 99/00 |

OTHER PUBLICATIONS

Hoffmann Martin et al: "dOSEK: the design and implementation of a dependability-oriented static embedded kernel", 21st IEEE Real-Time and Embedded Technology and Applications Symposium, IEEE, pp. 259-270, XP032777211, DOI: 10.1109/RTAS.2015.7108449, [found May 14, 2015], capture V-B; 2015.

* cited by examiner

METHOD AND DEVICE FOR PROCESSING DATA VIA CODED OPERATIONS

BACKGROUND OF THE INVENTION

1. Field of the Invention

The present invention relates to the processing of data, in particular to the coded processing of data and, more particularly, to a device for processing data via coded operations in a number of cycles, a functionally secure programmable controller having such a device, a method and to a computer program product for processing data via the coded operations in the number of cycles.

2. Description of the Related Art

Functionally secure systems are used to reduce risks to health and life and to avoid environmental damage. In addition to securely recording and communicating process information, they require secure processing, such as in programmable logic controllers (PLCs) or in industrial PCs.

When applying functionally secure systems, it is normal to process the data in coded form to be able to protect them against errors and undetected change. In the case of arithmetic coding, an uncoded variable x is expanded by various check bits that make it possible to detect certain errors that occur. By way of example, using arithmetic coding, it is possible to detect, inter alia, errors in the value range, operand and operator errors or non-up-to-date variables that are used.

One frequently used form of arithmetic coding is ANBD coding. In ANBD coding, an uncoded variable x is converted into a coded variable $x_c$ by way of an input constant A, a variable-specific signature $B_x$ and a cycle-specific signature D in according with equation (1) below:

$$x_c = A \cdot x + B_x + D \qquad \text{Eq. (1)}$$

With a coded variable $x_c$, calculation may be performed using coded operations, such as CADD, CSUB or CMOV. The coded operations can be returned to arithmetic operations, such as in this case ADD, SUB, MOV(E), as follows. Here, K is a parameter that can be calculated beforehand, and $y_c$ represents a coded variable:

$$\text{CADD: } z_c = (x_c + y_c + K) - D \qquad \text{Eq. (2)}$$

$$\text{CSUB: } z_c = (x_c + D + K) - y_c \qquad \text{Eq. (3)}$$

$$\text{CMOV: } z_c = x_c + K \qquad \text{Eq. (4)}$$

A disadvantage of ANBD coding is that this form of coding, illustrated by way of example with reference to the rules of CADD, CSUB and CMOV shown above, is connected with a high overhead in terms of runtime performance. This means that the ANBD coding, when processing coded data to form the required payload data, also requires additional extra data, which are used for example for transmission and storage purposes.

The following overview explains the high overhead in the case of ANBD coding:

| Coded operation | Expenditure | | Expenditure | Uncoded operation |
|---|---|---|---|---|
| CADD | 2xADD/1xSUB | instead of | 1xADD | ADD |
| CSUB | 2xADD/1xSUB | instead of | 1xSUB | SUB |
| CMUL | 7xMUL/6xADD/2xSUB | instead of | 1xMUL | MUL |
| CMOV | 1xADD | instead of | — | MOV |

This leads to a situation whereby expensive hardware, such as powerful CPUs, are required to process the coded data.

EP 3104276 A1, for example, discloses ANBD coding.

SUMMARY OF THE INVENTION

Accordingly, it is an object of the present invention to improve the processing of data via coded operations.

This and other objects and advantages are achieved in accordance with the invention by a method for processing data via coded operations in a number of cycles. Here, an uncoded variable x is coded with a cycle-specific signature D and a variable-specific signature $B_x$ to form a coded variable $x_c$ in accordance with equation (5):

$$x_c = D \cdot x + B_x. \qquad \text{Eq. (5)}$$

The rule of equation (5) may also be referred to as DNB coding. Since DNB coding just has the B signature and the D signature. As a result, the coding is simplified in comparison with ANBD coding, which has the B signature and the D signature as well as the input constant A. The input constant A is not used in the present case.

The abovementioned DNB coding rule gives the following saving in terms of the expenditure in comparison with ANBD coding:

| Coded operation | Expenditure ANBD | Expenditure DNB | Absolute saving | Relative saving |
|---|---|---|---|---|
| CMOV | 1xADD | 1xADD | 0 | 0% |
| CADD | 2xADD/1xSUB | 2xADD | 1xSUB | 33% |
| CSUB | 2xADD/1xSUB | 1xADD/1xSUB | 1xADD | 33% |
| CMUL | 7xMUL/6xADD/2xSUB | 5xMUL/2xADD/2xSUB | 2xMUL/4xADD | 40% |

DNB coding thus has the technical effect that the expenditure can be reduced by up to 40% in comparison with ANBD coding.

The same performance as with ANBD coding can therefore be achieved, with at the same time a reduction in the required computational power. Hardware with reduced computational power is able to be used. Consequently, the hardware costs can be lowered.

x is an uncoded variable x. x is coded via arithmetic coding using the above-defined DNB coding rule to form $x_c$.

D is a cycle-specific signature D. Here, cycle-specific means the D signature in one cycle is the same for all operands, but may change for a subsequent or further cycle. In this case, a cycle corresponds in particular to running through a loop. In other words, this means that the value of D within one cycle is the same for all operands, but may change for a further cycle.

The use of the cycle-specific signature D makes it possible to detect when non-up-to-date or outdated variables are used in the further processing of data.

$B_x$ is a variable-specific signature. Variable-specific in this case means that, for each variable, such as x, y, z, the associated B signature, i.e., $B_x$, $B_y$ or $B_z$, has a specific value that is dependent on the respective variables. $B_x$ is additionally preferably static, which means that the value of $B_x$ or of $B_y$ or of $B_z$ is the same for each cycle. The value of $B_x$ for two operands is furthermore highly likely to be different.

The use of the variable-specific signature $B_x$ makes it possible to detect and to prevent operand and operator errors. Examples of operand errors are a mix-up of operands or use of an incorrect operand (for example, reading of an incorrect address). One example of an operator error is execution of an incorrect operation (for example, AND instead of ADD).

In accordance with one embodiment, the coded operations comprise logic coded operations and/or arithmetic coded operations.

An operation may be converted into a coded operation using a coding rule. In the case of coded operations, a distinction may be drawn at least between logically coded operations and arithmetically coded operations.

A logic operation is, for example, an AND, OR or NOT expression. A logically coded operation is thus, for example, a CAND, COR or CNOT expression, where the C in the CAND expression and the other coded expressions specifies that this is a coded AND expression. The same applies to the following arithmetic operations.

An arithmetic operation is, for example, an ADD, SUB, MUL or MOV operation. An arithmetically coded operation is thus, for example, CADD, CSUB, CMUL or CMOV.

In accordance with a further embodiment, the coded operations comprise a coded addition operation CADD, in which a first coded variable $x_c$ and a second coded variable $y_c$ are added using a first parameter $K_1$ to form a third coded variable $z_c$ in accordance with the following relationship:

$$z_c = (x_c + y_c + K_1),\qquad \text{Eq. (6)}$$

where the first parameter $K_1$ is calculated via a signature $B_x$ specific to the first variable x, a signature $B_y$ specific to the second variable y and a signature $B_z$ specific to the third variable z in accordance with the following relationship:

$$K_1 = B_z - B_x - B_y.\qquad \text{Eq. (7)}$$

In accordance with a further embodiment, the coded operations comprise a coded subtraction operation CSUB, in which a difference between a first coded variable $x_c$ and a second coded variable $y_c$ is calculated using a second parameter $K_2$ to provide a third coded variable $z_c$ in accordance with the following relationship:

$$z_c = (x_c - y_c + K_2),\qquad \text{Eq. (8)}$$

where the second parameter $K_2$ is calculated via a signature $B_x$ specific to the first variable x, a signature $B_y$ specific to the second variable y and a signature $B_z$ specific to the third variable z in accordance with the following relationship:

$$K_2 = B_z - B_x + B_y.\qquad \text{Eq. (9)}$$

In accordance with a further embodiment, the coded operations comprise a coded multiplication operation CMUL, in which a first coded variable $x_c$ and a second coded variable $y_c$ are multiplied using a third parameter $K_3$, the cycle-specific signature D and a multiplicative inverse INV(D) of the cycle-specific signature D to provide a third coded variable $z_c$ in accordance with the following relationship:

$$z_c = \text{INV}(D) \cdot (x_c \cdot y_c - B_x \cdot y_c - B_y \cdot x_c + B_z \cdot D + K_3),\qquad \text{Eq. (10)}$$

where the third parameter $K_3$ is calculated via a signature $B_x$ specific to the first variable x and a signature $B_z$ specific to the third variable z in accordance with the following relationship:

$$K_3 = B_y \cdot B_z.\qquad \text{Eq. (11)}$$

In accordance with a further embodiment, the coded operations comprise a coded move operation CMOV for an assignment within a particular cycle, in which one coded variable $x_c$ is assigned to another coded variable $z_c$ using a fourth parameter $K_4$ in accordance with the following relationship:

$$z_c = x_c + K_4,\qquad \text{Eq. (12)}$$

where the fourth parameter $K_4$ is calculated by way of a signature $B_x$ specific to the variable x and a signature $B_z$ specific to the other variable z in accordance with the following relationship:

$$K_4 = B_z - B_x.\qquad \text{Eq. (13)}$$

In accordance with a further embodiment, the coded operations comprise a coded move operation CMOVD for an assignment of a first cycle to a second cycle, in which one coded variable $x_c$ is assigned to another coded variable $z_c$ using a fifth parameter $K_5$ and a sixth parameter $K_6$ in accordance with the following relationship:

$$z_c = K_5 \cdot x_c + K_6,\qquad \text{Eq. (14)}$$

where the fifth parameter $K_5$ is calculated in accordance with the following relationship:

$$K_5 = D_2 \cdot \text{INV}(D_1),\qquad \text{Eq. (15)}$$

where $D_2$ denotes the signature specific to the second cycle and $\text{INV}(D_1)$ denotes the multiplicative inverse of the signature $D_1$ specific to the first cycle, where the sixth parameter $K_6$ is calculated using the fifth parameter $K_5$, the signature $B_x$ specific to the variable x and the signature $B_z$ specific to the other variable z in accordance with the following relationship:

$$K_6 = B_z - K_5 \cdot B_x.\qquad \text{Eq. (16)}$$

By way of equations (14) to (16), the coded move operation CMOVD can be derived in detail as follows utilizing equation (17) below, where it holds true that $(D_1 \cdot \text{INV}(D_1) \text{ modulo } 2^n) = 1$:

$$\begin{aligned} \text{CMOVD: } z_c &= D_2 \cdot x + B_z \\ &= D_2 \cdot ((x_c - B_x)/D_1) + B_z \\ &= D_2 \cdot (1 \cdot (x_c - B_x)/D_1) + B_z \\ &= D_2 \cdot (D_1 \cdot \text{INV}(D_1) \cdot (x_c - B_x)/D_1) + B_z \\ &= D_2 \cdot (\text{INV}(D_1) \cdot (x_c - B_x)) + B_z \\ &= D_2 \cdot \text{INV}(D_1) \cdot x_c - D_2 \cdot \text{INV}(D_1) \cdot B_x + B_z \\ &= K_5 \cdot x_c - K_5 \cdot B_x + B_z \\ &= K_5 \cdot x_c + K_6. \end{aligned} \qquad \text{Eq. (17)}$$

$\text{INV}(D_1)$ denotes the multiplicative inverse of the signature $D_1$ specific to the first cycle in the finite body $2^n$ or in the Galois body $2^n$, where n is the word width of the arithmetic operations that are used. This word width is preferably set at 32 or 64 bits.

In accordance with a further embodiment, the fifth parameter $K_5$ and the sixth parameter $K_6$ are calculated before application of the coded operations and stored in a storage unit.

In addition to the parameters $K_5$ and $K_6$, the parameters $K_1$ to $K_4$ may be calculated before application of the coded operations and stored in a storage unit.

In accordance with a further embodiment, a hash table is used as the storage unit.

The various values of $INV(D_1)$ and $K_1$ to $K_6$ may be calculated beforehand and stored in a hash table that is accessed once in each cycle, such as via $D_1$ or $D_2$.

The hash table may be stored, for example, on a non-volatile memory, such as a memory card, a USB stick, a CD-ROM, a DVD, a Blu-ray disk or a ROM.

In accordance with a further embodiment, the uncoded variable x is coded during a compilation procedure to form the coded variable $x_c$.

It is also an object of the invention to provide a computer program product such as a computer-readable medium that prompts the performance of the method, as explained above, in accordance with the invention, on a program-controlled apparatus.

A computer program product, such as a computer program means, for example, may be provided or delivered, for example, as a storage medium, such as a memory card, USB stick, CD-ROM, DVD, Blu-ray disk, for example, or else in the form of a file downloadable from a server in a network. This may occur, for example, in a wireless communication network through the transmission of an appropriate file comprising the computer program product or the computer program means.

It is also an object of the invention to provide a device for processing data via coded operations in a number of cycles. The device comprises a coding unit that is configured so as to code an uncoded variable x with a cycle-specific signature D and a variable-specific signature $B_x$ to form a coded variable $x_c$ in accordance with the following relationship:

$$x_c = D \cdot x + B_x. \qquad \text{Eq. (5)}$$

The respective unit, for example the coding unit, may be implemented in the form of hardware and/or also in the form of software. In the case of an implementation in the form of hardware, the respective unit may be formed as a device or as part of a device, such as a computer or as a microprocessor or as a control computer of a vehicle. In the case of an implementation in the form of software, the respective unit may be formed as a computer program product, as a function, as a routine, as part of a program code or as an executable object.

The embodiments and features described for the proposed method apply accordingly to the proposed device.

It is also an object of the invention to provide a functionally secure programmable controller having a device in accordance with the invention.

Further possible implementations of the invention also include combinations of features or embodiments that have been described above or are described hereinafter with reference to the exemplary embodiments but have not been mentioned explicitly. In this case, a person skilled in the art will also add individual aspects as improvements or additions to the respective basic form of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantageous refinements and aspects of the invention are the subject matter of the dependent claims and of the exemplary embodiments, described below, of the invention. The invention is explained in more detail below on the basis of preferred embodiments with reference to the attached figures, in which:

DETAILED DESCRIPTION OF THE EXEMPLARY EMBODIMENTS

In the figures, identical or functionally identical elements have been provided with the same reference signs, unless indicated otherwise.

Figure 1:
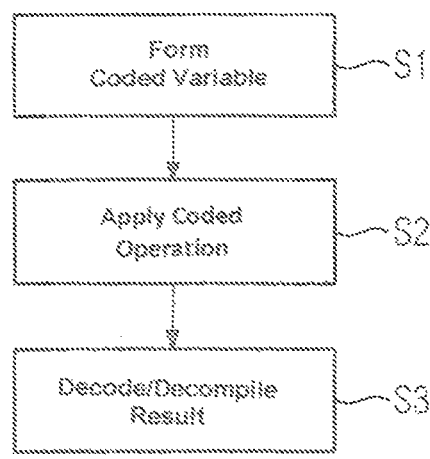
FIG. 1 shows a schematic diagram of one exemplary embodiment of a method for processing data via coded operations in accordance with the invention.

FIG. 1 shows a schematic diagram of one exemplary embodiment of a method for processing data via coded operations in a number of cycles in accordance with the invention.

The exemplary embodiment of FIG. 1 comprises the following method steps S1, S2 and S3:

In step S1, an uncoded variable x is coded to form a coded variable $x_c$. In the present exemplary embodiment, by way of example, the three variables x, y and z are used.

In detail, in step S1, the respective uncoded variable x, y and z is coded with a cycle-specific signature D and a respective variable-specific signature $B_x$, $B_y$ and $B_z$ to form a coded variable $x_c$, $y_c$ and $z_c$ in accordance with the following relationship:

$$x_c = D \cdot x + B_x$$

$$y_c = D \cdot y + B_y$$

$$z_c = D \cdot z + B_z \qquad \text{Eq. (5)}$$

The respective uncoded variable x, y and z is preferably coded during a compilation procedure to form the respective coded variable $x_c$, $y_c$ and $z_c$.

In step S2, at least one coded operation is applied to at least one of the coded variables $x_c$, $y_c$ and $z_c$.

The coded operations particularly comprise logic coded operations and/or arithmetic coded operations. Here, the coded operations particularly comprise a coded addition operation CADD, a coded subtraction operation CSUB, a coded multiplication operation CMUL, a coded move operation CMOV for an assignment within a particular cycle, and a coded move operation CMOVD for an assignment from a first cycle to a second cycle. The coded operations may preferably be executed as follows.

In the case of the coded addition operation CADD, a first coded variable $x_c$ and a second coded variable $y_c$ are added using a first parameter $K_1$ to form a third coded variable $z_c$ in accordance with the following relationship:

$$z_c=(x_c+y_c+K_1),\qquad\text{Eq. (6)}$$

where the first parameter $K_1$ is calculated via a signature $B_x$ specific to the first variable x, a signature $B_y$ specific to the second variable y and a signature $B_z$ specific to the third variable z in accordance with the following relationship:

$$K_1=B_z-B_x-B_y.\qquad\text{Eq. (7)}$$

Furthermore, in the case of the coded subtraction operation CSUB, a difference between a first coded variable $x_c$ and a second coded variable $y_c$ is calculated using a second parameter $K_2$ to provide a third coded variable $z_c$ in accordance with the following relationship:

$$z_c=(x_c-y_c+K_2),\qquad\text{Eq. (8)}$$

where the second parameter $K_2$ is calculated via a signature $B_x$ specific to the first variable x, a signature $B_y$ specific to the second variable y and a signature $B_z$ specific to the third variable z in accordance with the following relationship:

$$K_2=B_z-B_x+B_y.\qquad\text{Eq. (9)}$$

In the case of the coded multiplication operation CMUL, a first coded variable $x_c$ and a second coded variable $y_c$ are multiplied using a third parameter $K_3$, the cycle-specific signature D and a multiplicative inverse INV(D) of the cycle-specific signature D to provide a third coded variable $z_c$ in accordance with the following relationship:

$$z_c=\text{INV}(D)\cdot(x_c\cdot y_c-B_x\cdot y_c-B_y\cdot x_c+B_z\cdot D+K_3),\qquad\text{Eq. (10)}$$

where the third parameter $K_3$ is calculated via a signature $B_x$ specific to the first variable x and a signature $B_z$ specific to the third variable z in accordance with the following relationship:

$$K_3=B_y\cdot B_z.\qquad\text{Eq. (11)}$$

Then, in the case of the coded move operation CMOV, which is provided for an assignment within a particular cycle, one coded variable $x_c$ is assigned to another coded variable $z_c$ using a fourth parameter $K_4$ in accordance with the following relationship:

$$z_c=x_c+K_4,\qquad\text{Eq. (12)}$$

where the fourth parameter $K_4$ is calculated by way of a signature $B_x$ specific to the variable x and a signature $B_z$ specific to the other variable z in accordance with the following relationship:

$$K_4=B_z-B_x.\qquad\text{Eq. (13)}$$

In the case of the coded move operation CMOVD, which is provided for an assignment of a first cycle to a second cycle, one coded variable $x_c$ is assigned to another coded variable $z_c$ using a fifth parameter $K_5$ in accordance with the following relationship:

$$z_c=K_5\cdot x_c+K_6,\qquad\text{Eq. (14)}$$

where the fifth parameter $K_5$ is calculated in accordance with the following relationship:

$$K_5=D_2\cdot\text{INV}(D_1),\qquad\text{Eq. (15)}$$

where $D_2$ denotes the signature specific to the second cycle and $\text{INV}(D_1)$ denotes the multiplicative inverse of the signature $D_1$ specific to the first cycle, and where the sixth parameter $K_6$ is calculated using the fifth parameter $K_5$, the signature $B_x$ specific to the variable x and the signature $B_z$ specific to the other variable z in accordance with the following relationship:

$$K_6=B_z-K_5\cdot B_x.\qquad\text{Eq. (16)}$$

Figure 2:
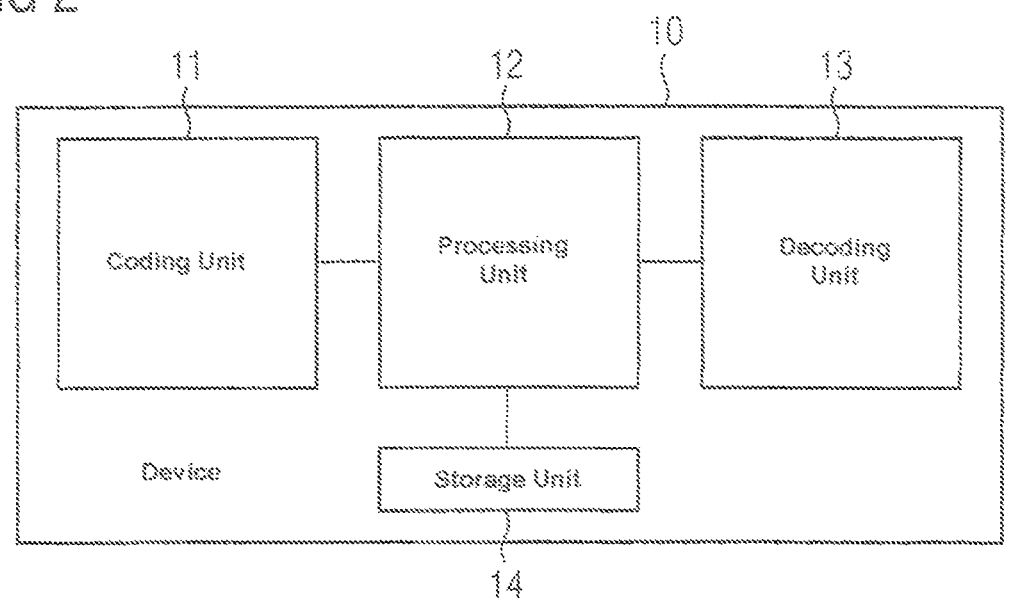
FIG. 2 shows a schematic block diagram of one exemplary embodiment of a device for processing data by way of coded operations in accordance with the invention.

The fifth parameter $K_5$ and the sixth parameter $K_6$ may preferably be calculated before application of the coded operations in step S2 and be stored in a storage unit 14 (see FIG. 2).

In step S3, the coded variables $x_c$, $y_c$, $z_c$ and/or results of the coded operations may be decoded or decompiled.

FIG. 2 shows a schematic block diagram of one exemplary embodiment of a device 10 for processing data via coded operations in a number of cycles. The device 10 comprises a coding unit 11, a processing unit 12 and a decoding unit 13.

The decoding unit 11 is configured so as to code an uncoded variable x with a cycle-specific signature D and a variable-specific signature $B_x$ to form a coded variable $x_c$ in accordance with the following relationship:

$$x_c=D\cdot x+B_x.\qquad\text{Eq. (5)}$$

The coding unit 11 is in particular configured so as to execute method step S1 of FIG. 1 and in particular also so as to code further uncoded variables or operands.

The processing unit 12 is configured so as to apply coded operations, such as the abovementioned CADD, CSUB and the like, to the coded variables $x_c$, $y_c$ and $z_c$.

In particular, when applying the coded move operation CMOVD, the processing unit 12 may access the abovementioned storage unit 14, which in particular stores the fifth parameter $K_5$ and the sixth parameter $K_6$. The storage unit 14 may furthermore also store further parameters or values that were calculated beforehand. The storage unit 14 is in particular formed as a hash table.

The decoding unit 13 is in turn configured so as to decode or to decompile variables or operands that are present in coded form for further processing.

Figure 3:
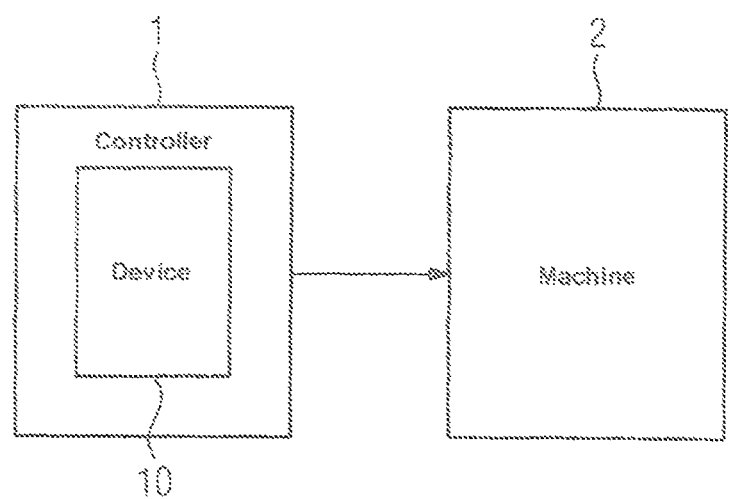
FIG. 3 shows a schematic block diagram of one exemplary embodiment of a functionally secure programmable controller having the device of FIG. 2.

FIG. 3 shows a schematic block diagram of one exemplary embodiment of a functionally secure programmable controller 1.

The controller 1 is configured so as to drive a machine 2, such as a conveyor belt or a robotic arm. For this purpose, the controller 1 of FIG. 3 has a device 10 as described with reference to FIG. 2 for processing data via coded operations.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A method for processing data via coded operations during a plurality of processing cycles to reduce a required computational power of a device included in a program-controlled apparatus, the method comprising:
acquiring the data;
coding an uncoded variable x with a cycle-specific signature D and a variable-specific signature $B_x$ to form a coded variable $x_c$ to reduce the required computational power of the device utilizing the relationship:

$$x_c = D \cdot x + B_x;$$

operating the program-controlled apparatus including the device having the reduced required computational power.

2. The method as claimed in claim 1, wherein the coded operations comprise at least one of (i) logic coded operations and (ii) arithmetic coded operations.

3. The method as claimed in claim 1, wherein the coded operations comprise a coded addition operation CADD in which a first coded variable $x_c$ and a second coded variable $y_c$ are added utilizing a first parameter $K_1$ to form a third coded variable $z_c$ in accordance with the following relationship:

$$z_c = (x_c + y_c + K_1); \text{ and}$$

wherein the first parameter $K_1$ is calculated via a signature $B_x$ specific to the first variable x, a signature $B_y$ specific to the second variable y and a signature $B_z$ specific to the third variable z in accordance with the following relationship:

$$K_1 = B_z - B_x - B_y.$$

4. The method as claimed in claim 2, wherein the coded operations comprise a coded addition operation CADD in which a first coded variable $x_c$ and a second coded variable $y_c$ are added utilizing a first parameter $K_1$ to form a third coded variable $z_c$ in accordance with the following relationship:

$$z_c = (x_c + y_c + K_1); \text{ and}$$

wherein the first parameter $K_1$ is calculated via a signature $B_x$ specific to the first variable x, a signature $B_y$ specific to the second variable y and a signature $B_z$ specific to the third variable z in accordance with the following relationship:

$$K_1 = B_z - B_x - B_y.$$

5. The method as claimed in claim 1, wherein the coded operations comprise a coded subtraction operation CSUB in which a difference between a first coded variable $x_c$ and a second coded variable $y_c$ is calculated utilizing a second parameter $K_2$ to provide a third coded variable $z_c$ in accordance with the following relationship:

$$z_c = (x_c - y_c + K_2); \text{ and}$$

wherein the second parameter $K_2$ is calculated by way of a signature $B_x$ specific to the first variable x, a signature $B_y$ specific to the second variable y and a signature $B_z$ specific to the third variable z in accordance with the following relationship:

$$K_2 = B_z - B_x + B_y.$$

6. The method as claimed in claim 1, wherein the coded operations comprise a coded multiplication operation CMUL in which a first coded variable $x_c$ and a second coded variable $y_c$ are multiplied using a third parameter $K_3$, the cycle-specific signature D and a multiplicative inverse INV(D) of the cycle-specific signature D to provide a third coded variable $z_c$ utilizing the relationship:

$$z_c = \text{INV}(D) \cdot (x_c \cdot y_c - B_x \cdot y_c - B_y \cdot x_c + B_z \cdot D + K_3); \text{ and}$$

wherein the third parameter $K_3$ is calculated via of a signature $B_x$ specific to the first variable x and a signature $B_z$ specific to the third variable z in accordance with the following relationship:

$$K_3 = B_y \cdot B_z.$$

7. The method as claimed in claim 1, wherein the coded operations comprise a coded move operation CMOV for an assignment within a particular cycle in which one coded variable $x_c$ is assigned to another coded variable $z_c$ using a fourth parameter $K_4$ in accordance with the following relationship:

$$z_c = x_c + K_4; \text{ and}$$

wherein the fourth parameter $K_4$ is calculated via a signature $B_x$ specific to the variable x and a signature $B_z$ specific to the other variable z utilizing the relationship:

$$K_4 = B_z - B_x(S2).$$

8. The method as claimed in claim 1, wherein the coded operations comprise a coded move operation CMOVD for an assignment of a first cycle to a second cycle in which one coded variable $x_c$ is assigned to another coded variable $z_c$ utilizing a fifth parameter $K_5$ and a sixth parameter $K_6$ in accordance with the following relationship:

$$z_c = K_5 \cdot x_c + K_6; \text{ and}$$

wherein the fifth parameter $K_5$ is calculated in accordance with the following relationship:

$$K_5 = D_2 \cdot \text{INV}(D_1);$$

wherein $D_2$ denotes a signature specific to the second cycle and $\text{INV}(D_1)$ denotes a multiplicative inverse of a signature $D_1$ specific to the first cycle; and wherein the sixth parameter $K_6$ is calculated utilizing the fifth parameter $K_5$, the signature $B_x$ specific to the variable x and the signature $B_z$ specific to the other variable z in accordance with the following relationship:

$$K_6 = B_z - K_5 \cdot B_x(S2).$$

9. The method as claimed in claim 8, wherein the fifth parameter $K_5$ and the sixth parameter $K_6$ are calculated before application of the coded operations and stored in a storage unit.

10. The method as claimed in claim 9, wherein the storage unit comprises a hash table.

11. The method as claimed in claim 1, wherein the uncoded variable x is coded during a compilation procedure to form the coded variable $x_c$.

12. A non-transitory computer readable medium encoded with a computer program which, when executed by a coding unit included in a program-controlled apparatus, causes processing of data via coded operations during a plurality of processing cycles to reduce a required computational power of the coding unit, the computer program comprising:

program code for acquiring the data; and program code for coding an uncoded variable x with a cycle-specific signature D and a variable-specific signature $B_x$ to form a coded variable $x_c$ to reduce the required computational power of the coding unit in accordance with the following relationship:

$$x_c = D \cdot x + B_x;$$

program code for operating the program-controlled apparatus including the coding unit having the reduced required computational power.

13. A device for processing data via coded operations during a plurality of processing cycles to reduce a required computational power of the device, the device comprising:

a coding unit configured so as to code an uncoded variable x with a cycle-specific signature D and a variable-specific signature $B_x$ to form a coded variable $x_c$ to reduce the required computational power of the device in accordance with the relationship:

$$x_c = D \cdot x + B_x;$$

wherein the device is included in a program-controlled apparatus.

14. A functionally secure programmable controller having the device as claimed in claim 13.

\* \* \* \* \*